United States Patent [19]

Niziol

[11] Patent Number: 4,589,792
[45] Date of Patent: May 20, 1986

[54] KNOCK-DOWN FURNITURE CONSTRUCTION, CORNER BRACKET AND METHOD

[76] Inventor: Chester Niziol, 92 Church St. South, Suite 108, Pickering, Ontario, Canada, L1V 2S6

[21] Appl. No.: 465,929

[22] Filed: Feb. 14, 1983

Related U.S. Application Data

[63] Continuation-in-part of Ser. No. 173,115, Jul. 28, 1980, Pat. No. 4,421,366.

[51] Int. Cl.[4] .......................... B25G 3/00; F16B 12/00
[52] U.S. Cl. ...................................... 403/11; 403/231; 403/403; 29/526 R
[58] Field of Search ................. 403/11, 403, 205, 231; 29/526 R

[56] References Cited

U.S. PATENT DOCUMENTS

| 3,466,071 | 9/1969 | Reed | 403/230 X |
| 3,674,289 | 7/1972 | Geraci | 403/407 |
| 3,854,268 | 12/1974 | Gutner | 403/403 |
| 4,014,618 | 3/1977 | Kristiansen | 403/231 X |
| 4,278,361 | 7/1981 | Steinke | 403/189 |
| 4,301,636 | 11/1981 | Luria | 403/405 |
| 4,421,366 | 12/1983 | Niziol | 403/188 X |

FOREIGN PATENT DOCUMENTS

1491071 11/1977 United Kingdom ............... 403/231

Primary Examiner—Andrew V. Kundrat
Attorney, Agent, or Firm—John J. Swartz

[57] ABSTRACT

Apparatus for and method of forming any selected one of a plurality of different articles of furniture, such as seating, storage, and sleeping units comprising a plurality of panels each having inner and outer faces terminating in a perimetrical edge, and mechanism for detachably coupling any selected number of panels together in angular relation such that the perimetrical edge of each panel is positioned inwardly of the outer face of an adjacent angularly related panel and the outer face of each panel is positioned outwardly of the perimetrical edge of the adjacent angularly related panel to provide outwardly opening openings adjacent the adjacent perimetrical edges of adjacent panels. One aspect of the invention includes a corner coupling bracket for coupling adjacent angularly related panels to form outwardly opening openings at the adjacent ends of adjacent panels.

29 Claims, 12 Drawing Figures

KNOCK-DOWN FURNITURE CONSTRUCTION, CORNER BRACKET AND METHOD

This application is a continuation-in-part application of United States Patent application, Ser. No. 173,115, now U.S. Pat. No. 4,421,366 entitled "Self-Assembly Furniture Construction" filed in the United States Patent Office on July 28, 1980, which is fully incorporated herein by reference as though recited word for word herein.

BACKGROUND OF THE INVENTION

1. Field of the Invention

This invention relates to a modular unit of furniture including a plurality of panels coupled together in such manner to provide outwardly opening openings at the adjacent ends of the adjacent panels and a new and novel corner bracket for detachably coupling a plurality of angularly related furniture panels. One aspect of the invention includes a method of assembling an article of furniture. The modular unit may be selectively coupled to similarly constructed modular units in selected combinations to provide any one of the plurality of different items of furniture.

2. Description of the Prior Art

Conventionally constructed assembled and preassembled furniture includes side, end, and back wall members having planar ends mounted such that the planar end of one panel is flush with the outer face of an abutting panel. The style of furniture available to potential purchasers is conventional. Accordingly, it is an object of the present invention to provide apparatus for forming a unit of furniture having adjacent panels coupled together in such a manner as to form outwardly opening openings between the adjacent ends thereof. Much of the furniture presently being manufactured is assembled or pre-assembled at the manufacturing site and subsequently shipped to wholesalers and retailers throughout the country. Pre-assembled furniture is relatively bulky and thus shipping costs are relatively high. Society is becoming increasingly mobile, and shipping costs for individuals moving such assembled or partially assembled furniture is likewisely becoming increasingly expensive. A large portion of such assembled and pre-assembled furniture is limited to form one particular item of furniture and is not generally convertible, without substantial alteration, to form a different unit of furniture. Accordingly, it is an object of the present invention to provide apparatus for forming a modular, knock-down furniture unit, convertible for use in constructing any one of a plurality of different furniture items.

Another object of the present invention is to provide apparatus for forming a modular furniture component which can be combined in various combinations with similarly constructed modular units to form various items of furniture suitable for seating, sleeping and storage.

Still another object of the present invention is to provide apparatus for forming a modular furniture unit for use in combination with a multiple of similarly constructed modular units to form any one of the plurality of various furniture combinations.

A further object of the present invention is to provide apparatus for forming a knock-down modular furniture unit which can be easily assembled and disassembled.

A still further object of the present invention is to provide an article of furniture which can be assembled and disassembled, including a plurality of panels and mechanism for detachably coupling the panels such that the end face portions of each panel are positioned inwardly of the adjacent outer side faces of an adjacent, angularly related panels and the outer face of each panel is positioned outwardly of the adjacent end face of an adjacent angularly related panel to provide outwardly opening openings between adjacent portions of the end faces of adjacent panels.

Another object of the present invention is to provide apparatus for forming an article of furniture comprising a plurality of panels and mechanism for coupling angularly related panels such that portions of the end faces of each panel are disposed adjacent a portion of an end face of an adjacent panel to provide outwardly opening channels between the adjacent ends of adjacent panels.

Yet another object of the present invention is to provide new and novel coupling apparatus for detachably coupling angularly related panel members so as to provide outwardly opening openings at the adjacent ends of adjacent panels.

Another object of the present invention is to provide a corner bracket for detachably coupling a plurality of pre-assembled planar panels, disposed in a predetermined angular relation, including bolt-receiving outwardly extending projections, which are received in corresponding recesses in the panels, beveled in such a way that the bracket may be installed without moving the panels.

Another object of the present invention is to provide a tri-planar corner bracket of the type described having bolt-receiving outwardly projecting bosses thereon which are beveled so as to be snugly received in the corner without movement of the pre-assembled panels.

It is another object of the present invention to provide a corner bracket for detachably coupling a plurality of pre-assembled planar furniture panels, disposed in a predetermined angular relation, of such construction that the order in which the panels are coupled is not critical.

Yet another object of the present invention is to provide a new and novel method of assembling a furniture component with a plurality of pre-assembled, angularly related furniture panels.

These and other objects of the present invention will become more readily apparent as the description thereof proceeds.

SUMMARY OF THE INVENTION

Apparatus for forming any selected one of a plurality of different articles of furniture comprising a plurality of panels each including inner and outer side faces and a plurality of end face portions joined to the inner and outer side faces at inner and outer perimetrical edge portions; and mechanism for coupling the panels in angular relation to adjacent ones of the panels with an inner edge portion of one of the end face portions of each panel being adjacent one of the adjacent inner edge portions of an adjacent end portion of an adjacent panel and the opposing outer edge portion of each adjacent end face portion of adjacent panels being spaced apart a predetermined distance to form outwardly opening openings between the adjacent end face portions of adjacent panels. One aspect of the invention includes a corner bracket having angularly related flanges having outwardly extending bolt-receiving projections which can be located in and dislocated from corresponding recesses provided in the panels without movement of the panels. Another aspect of the invention comprises a method of assembling an article of furniture with a plurality of furniture panels.

BRIEF DESCRIPTION OF THE DRAWINGS

The present invention may more readily be understood by reference to the accompanying drawings, in which.

DESCRIPTION OF THE INVENTION

Figure 1:
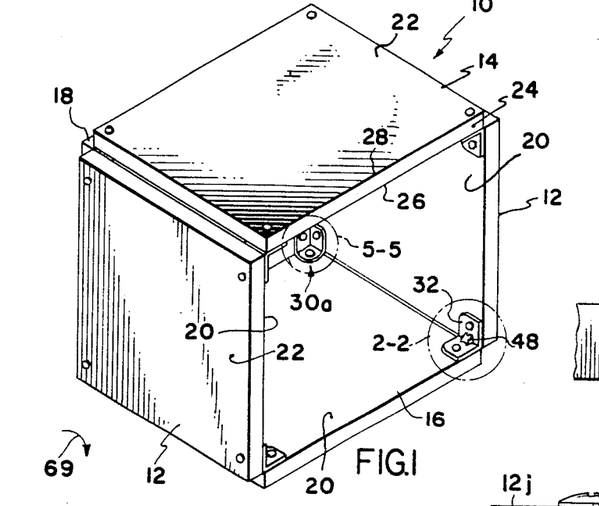
FIG. 1 is a perspective view of a modular furniture unit constructed according to the present invention.
Figure 2:
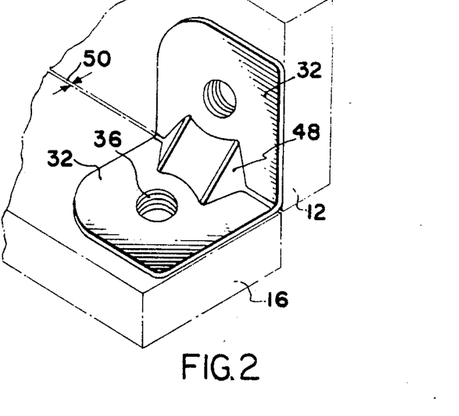
FIG. 2 is an enlarged, perspective view of the portion illustrated in the chain line circle in FIG. 1.

A modular furniture component constructed according to the present invention is generally designated 10 and includes generally planar, upstanding, sidewall members 12, generally planar top and bottom walls 14 and 16 respectively, and a generally planar rear wall panel 18. The panels 12, 14, 16, and 18 are substantially identical and each includes a generally planar inner face 20 and outer face 22 spanned by four perimetrically extending end faces 24. Panels may suitably comprise a particleboard core which may or may not be covered with layers of veneer melamine or the like. The end faces 24 are joined to the inner and outer faces 20 and 22 via inner and outer, perimetrically extending edges 26 and 28 respectively.

Coupling apparatus, generally designated 30, is provided for mounting the side panels 12 to the top and bottom panels 14 and 16, and includes a pair of right angularly related, integral flange members 32. Each of the flange members 32 includes an annular, outwardly projecting, extruded projection 34 including internal threads 36 for receiving the threaded end 38 of a bolt 40 which passes through an aligned aperture 42 provided in the panels 12, 14 and 16. The bore 42 may be countersunk as illustrated at 44 for snugly receiving the extruded projection 34. The bolts 40 include bolt head 46 for bearing against the outer face 22 of the various panels. An integrally formed gusset 48 spans the right angularly related flanges 32 to reinforce the coupling member 30. It should be noted that the coupling member 30 mounts the side panels 12 to the top and bottom panels 14 and 16 such that the inner perimetrical edges 26 of adjacent panels are spaced apart by a distance, represented by the reference character 50, (FIG. 4) and the outer perimetrical edges of adjacent panels are spaced apart a greater predetermined distance, represented by the reference character 52, to provide outwardly opening, open ended openings or channels, generally designated 54 which results in a new and novel furniture style and construction.

The end face 24 of each panel 12, 14, 16, and 18, lies outwardly of the plane 56 (FIG. 4) of the inner planar face 20 of the right angularly related, adjacent panel, and likewisely inwardly of the plane 58 of the outer face 22 of each adjacent panel.

Figure 3:
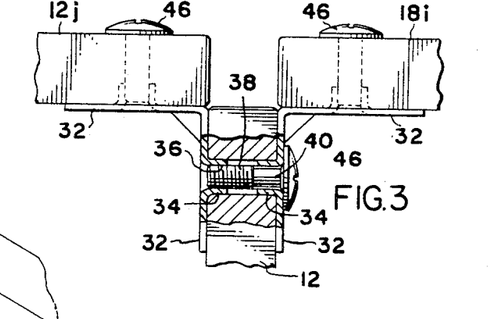
FIG. 3 is an enlarged, side elevational view of the portion illustrated in the chain line circle 3—3 of FIG. 7.
Figure 4:
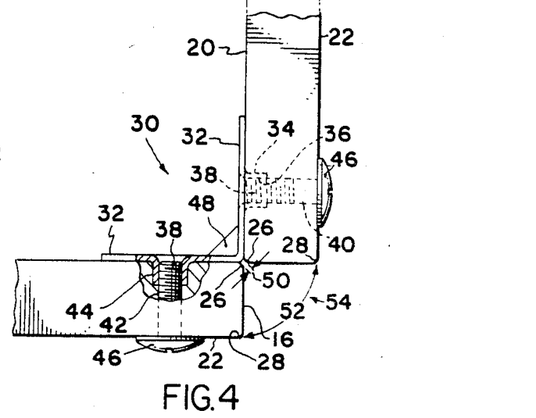
FIG. 4 is an enlarged, front elevational view of the portion illustrated in FIG. 2.

The rear wall 18 is coupled to the sidewalls 12 and top and bottom panels 14 and 16 via a slightly modified connector or coupling member, generally designated 30a (FIG. 4). The connector 30a is generally similar to the connector 30 and generally similar parts will be referred to by generally similar reference characters followed by the subscript a. The connector 30a includes a third flange member 60 which is integral with the flanges 32a but disposed at right angles thereto. The flange 60 includes an annular, outwardly projecting portion 64a which is internally threaded as illustrated at 66a. The rear wall panel 18 includes a bore 42 and counterbore 44 identical to that previously described with relation to FIG. 3 for receiving the internally threaded projecting portion 64a. A bolt 40 passes through the bore 42 and is received by the threaded projection 64a to similarly couple the rear panel 18 to the flange 60.

The article of furniture 10, in the position illustrated in FIG. 1, may suitably serve as an end table as well as a storage unit. If the item of furniture is rotated 90° in the direction of the arrow 69 (FIG. 1), the rear wall 18 will then become the top wall, suitable for use as a seat.

Figure 6:
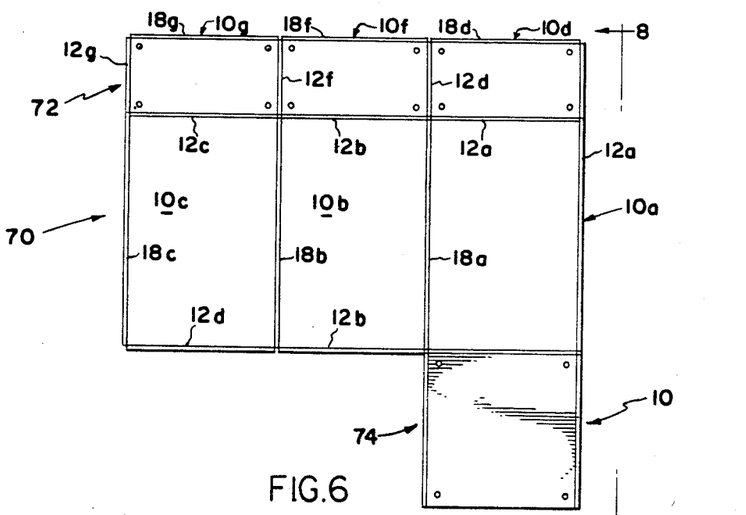
FIG. 6 is a top plan sectional view, taken along the lines 6—6 of FIG. 7, illustrating a combined article of furniture constructed with various combinations of the individual modular unit illustrated in FIG. 1.
Figure 7:
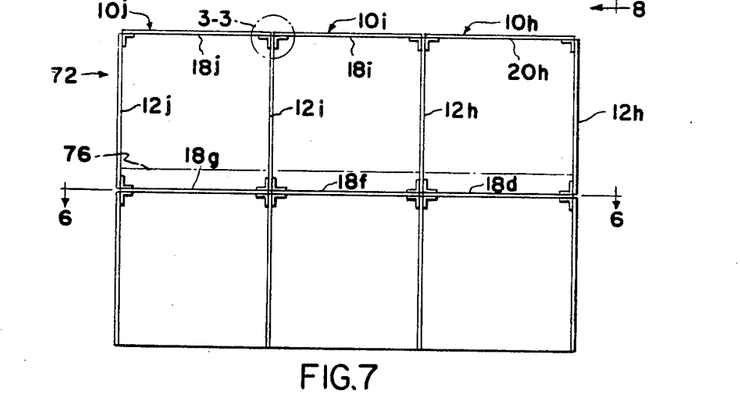
FIG. 7 is a side elevational view of the apparatus illustrated in FIG. 6.
Figure 8:
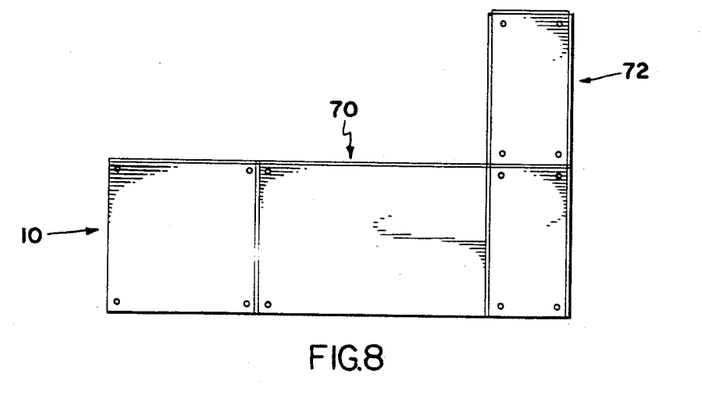
FIG. 8 is an end elevational view, taken along the line 8—8 of FIG. 6.

Referring now more particularly to FIGS. 6, 7, and 8, the basic modular unit 10 is illustrated in combination with similarly constructed modular units designated 10a, 10b, 10c, 10d, 10f, 10g, 10h, 10i, and 10j, to form a combination article of furniture including a bed frame 70, bookshelves 72, and an end table or study desk 74. The modular units 10a–10j include components similar to that illustrated for the unit 10 and generally similar parts will be identified with generally similar numerals followed by the subscript a–j respectively. It should be understood that although the lengths and widths of the various panel members of the modular units 10a–10g may vary, the basic construction of each modular unit illustrated remains the same. It should be further noted that the units 10f and 10g only include one sidewall 12f and 12g as these units incorporate the side walls 12d and 12f of adjacent modular units 10d and 10f respectively to complete the individual box-like units. A mattress, illustrated in chain lines and generally designated 76, may be mounted within the units 10a, 10b, and 10c to complete the bed unit 70.

Figure 9:
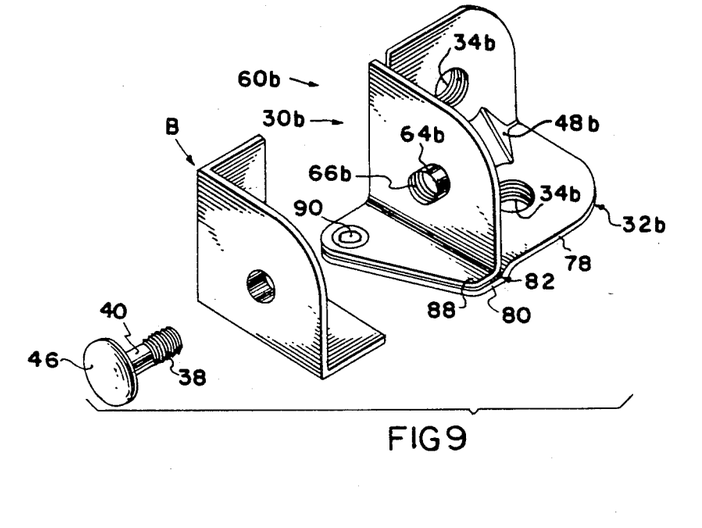
FIG. 9 is a perspective view of a combination two-way connector-pivot hinge and corner bracket constructed according to the present invention.
Figures 10, 11:
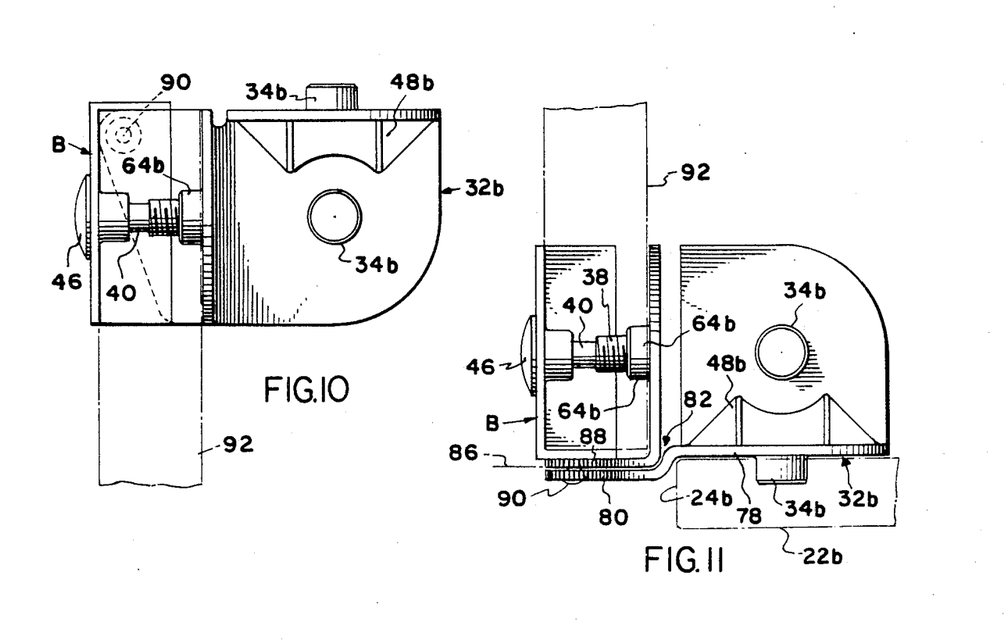
FIG. 10 is a top plan view thereof.
FIG. 11 is a front elevational view thereof.

The cabinets or bookshelves 72 are completed by mounting similar modular units 10h, 10i, and 10j above the modular units 10d, 10f, and 10g, as illustrated in FIG. 7. It should be noted that the units 10i and 10j, only include one side wall 12i and 12j as each of the units, 10i and 10j, utilize the adjacent walls 12h and 12i of the adjacent modular units 10h and 10i respectively, to complete their box-like configuration. As illustrated in FIG. 3, the adjacent units 10i–10j are coupled together via the bolts 40 which are each freely received in an unthreaded projection 34 of the flange 32 abutting one face of the panel 12i and then threaded into the opposing threaded projection 34 on the flange 32 bearing against the opposite face of the panel 12i. The hinge-connector, illustrated in FIGS. 9-11, is generally designated 30b, and includes a pair of right angularly related flanges, generally designated 32b. A gusset 48b spans the flanges 32b. The flanges 32b include annular, internally threaded outwardly projecting members 34b constructed substantially identical to the extruded thread projections, described heretofore.

One of the flange members 32b includes a first, generally planar flange portion 78 and an offset, generally planar second flange section 80, coupled to the first flange section 78 by a bridging section 82. As illustrated in FIG. 11 the plane 84 of the second flange section 80 is parallel to the plane 86 of the flange portion 78.

The connector 30b also includes a third flange section, generally designated 60b, including an annular, outwardly extending, extruded projection 64b internally threaded as illustrated at 66b. The flange 60b is illustrated as being disposed at right angles in FIG. 9 to the flange members 32b. The flange member 60b includes an offset flange portion 88 disposed at right angles relative to the flange member 60b and opposing the second flange portion 80 of the flange 32b. As illustrated in FIG. 11, the offset portion 88 generally lies in the plane 86 of the first flange portion 80 and abuts the bridging portion 82, in one position, to inhibit swinging movement thereof in one direction. The flange portion 88 and flange portion 80 are pivotally connected for relative swinging movement via a pivot pin 90. The flange portion 80 and 88 and the pivot pin 90 cooperate to define a hinge which permits relative swinging movement of the flange members 60b relative to the flange members 32b. A planar door panel, generally designated 92, is mounted on the flange 60b with a bolt 40 and a bracket, generally designated B. Such a door panel 92 may be mounted on the front of the unit 10 illustrated in FIG. 1, by substituting two connectors 30b for the two forwardmost connectors 30 mounted on one of the sidewalls 12. It should be understood that the hinges 60b, 90 permits the door 92 to swing outwardly between an open position and a closed position in which the end face 24b of panel 22b lies in the plane 56b of the right angularly related adjacent panel and likewisely that the plane 58b of the outer face 22b of the adjacent panel lies outwardly of the end face 24b.

In practice, the various panels 12, 14, 16 and 18, may be cut to suitable size and a plurality of bores 42 and counterbores 44 provided therein at the manufacturing site. The various panels 12, 14, 16 and 18, the coupling members 30, 30a, and 30b, and the bolts 40, may be packaged at the manufacturing site for shipment in a compact package to the ultimate user. The purchaser can easily and quickly couple the panels together via the coupling members 30, 30a, and 30b, in a variety of different combinations depending on his particular needs. The units thus assembled can be disassembled and reassembled in another furniture configuration to form seats, storage units, bed frames, etc. as illustrated in FIGS. 6-8. The purchaser may subsequently purchase additional modular units, or portions of modular units, to accommodate his subsequent needs. The apparatus, when assembled, provides a new and novel aesthetic item of furniture.

When assembled, a basic furniture unit will be provided as illustrated in FIG. 1. If desired, the rear wall panel 18 need not be installed, in which case the connectors 30a along the rearwardmost portion of sidewalls 12 would be replaced by connectors 30. On the other hand, the purchaser can order an additional panel 92 and install a door on the forward edge of one sidewall 12 via connectors 30b.

In practice it will be desirable to construct an article of furniture embodying the invention from sets of uniform panels. Fewer unique elements must be manufactured, and assembly is less critical because of the interchangeable nature of the panels. In this respect the provision of outwardly opening openings greatly facilitates addition to or modification of an existing structure. Because of the resultant spacing, panels can easily be displaced horizontally or vertically in a given structure, and additional panels can easily be fitted parallel to existing panels if suitable apertures are provided in existing transverse panels.

ALTERNATE EMBODIMENT

Figure 12:
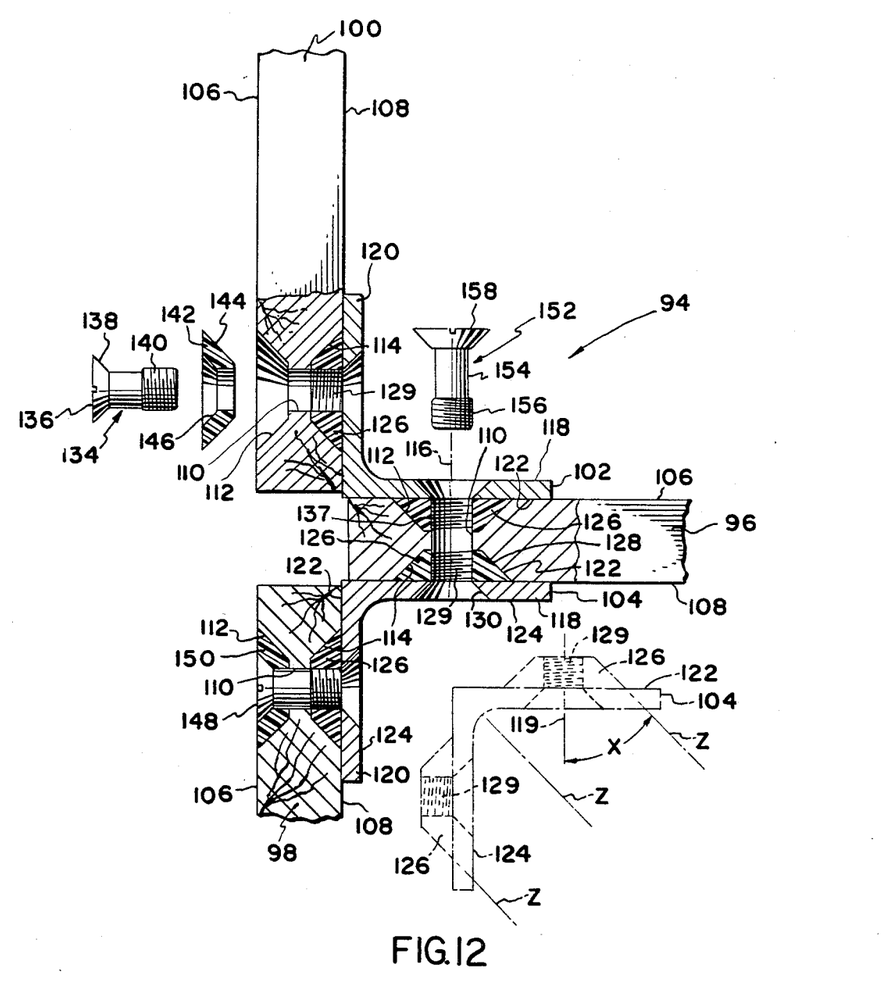
FIG. 12 is a plan view, partially fragmented and partially exploded, of a slightly modified furniture joint construction.

Referring now more particularly to FIG. 12, a joint, generally designated 94, is illustrated for orienting first, second, and third panels 96, 98, 100 in mutually perpendicular relationship. The joint 94 is constructed with first and second connectors, generally designated 102, 104, which are a variation of the connector 30 described above, that greatly facilitates assembly of the furniture units described above. The joint 94, which may suitably comprise plastic material, serves the same function as the joint indicated by reference characters 3—3 in FIG. 7 and illustrated in detail in FIG. 3.

Each of the panels 96, 98, 100 has a first side face 106, and an oppositely-disposed, generally parallel second side face 108. An aperture or bore 110 extends fully between the side faces 106, 108. A first counterbore or seat 112 is formed in the first side face 106, and a second counterbore or seat 114 is formed in the second side face 108, each about the aperture 110. The seats 112, 114 are substantially identical, radially symmetric about an axis 116, and conform in shape to projections (described more fully below) on the connectors 102, 104 to receive the projections in conforming engagement.

The connector 104 will be described in detail, like reference numerals being used to indicate like components in the connector 102. The connector 104 includes first and second substantially identical right angularly disposed integral flange members 118 and 120, each having a generally planar outer surface 122, and a generally planar inner surface 124. An integral annular, apertured projection 126 with a frustro-conical outer surface 128 extends outwardly from each outer surface 122. Each of the outer projection surfaces 128 is oriented at an included angle X of substantially 45° to the plane of the respective outer surface 122 of the flange members 118, 120, and is radially symmetric about an axis 119 which is perpendicular to the respective outer surface 122, and tends to taper or narrow smoothly away from the respective outer surface 122. The axes 116 and 119 are axially aligned when the connector 104 is mounted in the position illustrated in solid lines in FIG. 12. Each of the outer surfaces 128 is thus illustrated as converging radially inwardly, axially outwardly relative to the respective axis 119 and outer surface 122. Each projection 126 has an internal thread 129 for receiving the threads of a bolt, and a seat 130 with a radially symmetric surface is defined in each of the inner surfaces 124 of the flange members 118, 120, and serves in use to receive the head of a bolt with a conforming shape.

The construction of the connector 104 greatly simplifies the assembly of structures such as the furniture component 10. With a connector such as the connector 30, the sequence of assembly steps must be such that the connector 30 is first coupled to a first panel, and then a second panel added to the resulting structure. It will be apparent from examination of FIG. 4 that the projections 34 of the connector 30 cannot be simultaneously located in the apertures 42 of the panels 12, 16 if these panels are first oriented in the positions illustrated, by previous connection to other panels. The order in which the panels of a structure are coupled becomes critical. The connector 104 on the other hand can be moved from the position illustrated in chain lines in FIG. 12 to its final position, illustrated in solid lines in FIG. 12, against the pre-positioned panels 96, 100. This is done by moving the connector 104 from the removed position illustrated in chain lines in FIG. 12 to the position illustrated in solid lines in FIG. 12 along a path (lines Z, FIG. 12) which is oriented about at 45° to each of the side faces 108 of the panels 96, 100. The connector 104 can be removed just as easily for disassembly of the furniture component.

The outer surface 128 of each projection 126 must be inclined at an included angle of substantially 45° or less relative to the plane of the outer surface 122 of the respective flange member 118, 120. If inclined at more than the maximum angle of 45°, the facility to add or remove the connector 104 from the panels 96, 100 without varying the relative pre-assembled orientation of the panels 96, 100 is lost. The maximum angle in any case will depend on the angular relationship between adjacent panels to be connected, and, as the included angle between the panels increases, so does the maximum angle of beveling permissible. The frustroconical shape of the outer surfaces 128 is preferred for ease of construction, but any continuously tapering surface the tangent to any point of which intersects the outer surface 122 at less than the maximum angle will suffice to permit easy installation and removal.

A bolt 134 serves to secure the panel 100 to the second flange member 120 of the connector 102. The bolt 134 has a flat head 136 with a radially symmetric frustro-conical bottom surface 138, and a threaded shaft 140 which extends throough the aperture 110 of the panel 100 and which is received in the internal thread 129 of insert 126 of flange member 120 of the connector 102. An insert 142 molded of a plastic material is provided in the counterbore 112 of panel 100 to properly seat the bolt 142. The insert 142 has a radially symmetric outer surface 144 of frustro-conical shape adapted to seat in the first seat 112 of the panel 100, and a concave, radially symmetric inner surface 146 shaped to seat the bottom surface 138 of the bolt 134 in substantially conforming engagement. The insert 142 is provided because it is contemplated that, in practice, panels used to assemble an item of furniture will be non-unique and all may be provided with apertures about which are located first and second seats of the type described above. The insert 142 provides the bolt 134 with a better abuttment surface, and additionally serves to seat a flat-headed bolt generally flush with the surface of a panel. The panel 98 is secured to the second flange member 120 of the second connector 104 in a similar manner, with a flat-headed bolt 148 seated by means of an identical insert 150 flush with the side face 106 of the panel 98.

The panel 96 is secured to the flange member 118 of the first connector 102 by means of a bolt 152. The bolt 152 has an unthreaded shaft portion 154 which extends past the internal thread 129 of the projection 126 of the flange member 118 of the first connector 102, and a distal threaded portion 156 which is received by the internal thread 129 of the projection 126 of the first flange member 118 of the second connector 104. This construction permits the connectors 102, 104 to be tightened as much as desired about the panel 96 by rotation of the bolt 152; otherwise, considerable care would have to be taken to ensure during assembly that the panel 96 is tightly sandwiched between the connectors 102, 104 while a bolt is threaded through the aligned internal threads 129 of the first flange member 118. This problem could be eliminated by removing the redundant internal thread 137 of the first flange member 118 of the first connector 102, but it is desirable to minimize the number of unique components required to assemble an item of furniture. The head 158 of the bolt 152 is seated against the seat 130 of the flange member 118 of the connector 102.

Figure 5:
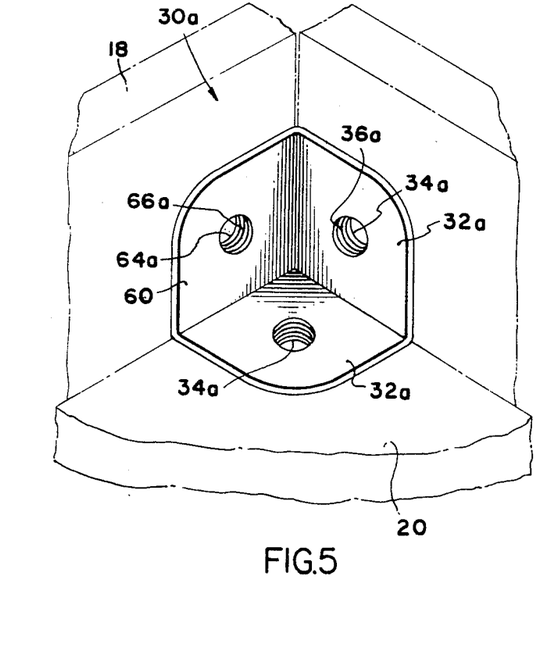
FIG. 5 is an enlarged, perspective view illustrating the portion of the apparatus encircled in the chain lines 5—5 of FIG. 1.

It will be appreciated that the principles of construction of the connectors 102, 104 can be applied to a connector such as the connector 30a illustrated in FIGS. 1 and 5 to provide a three-way connector which can be readily inserted or removed from panels.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

What I claim is:

1. An article of furniture comprising:
    a plurality of generally planar, angularly related panels, each having
        first and second generally parallel side faces;
        a first plurality of bolt receiving bores extending from said first side face to said second side face; and
        a counterbore provided in each of said side faces in axial alignment with said bore providing a seat surface which radially converges in an axial direction toward the other of said side faces;
    means for detachably coupling said panels together in a predetermined angular relationship but with adjacent border edge portions of adjacent panels being in spaced apart relationship to provide gaps between adjacent edges of adjacent panels, comprising:
    a corner bracket including:
        a plurality of individual bracket members, independent of the other bracket members, each bracket member including angularly related integrally connected flange members, each having an inner surface and an outer surface abutting one of said side faces;
    each of said flange members including an annular projection extending outwardly from said outer surface of said flange member;
    each of said projections having
        an internally, threaded bolt receiving bore therethrough; and an annular outer surface complimentarily shaped to conform to the shape of said seat surface and received by the counterbore of one of said panels;

an annular insert received in the counterbore provided in the other of said side faces of said adjacent panels, said insert having a second bolt receiving bore therethrough axially aligned with said first bolt receiving bore and an annular outer surface complementally shaped to the shape of said seat surface; and bolt means received by the bore of said inserts and threadedly coupled to said threaded bolt receiving bore of said projections.

2. The article of furniture set forth in claim 1, wherein said insert includes an outer surface provided with a concave recess;
said bolt means including a head received by said concave recess so as to be substantially flush with said outer surface of said insert.

3. The article of furniture set forth in claim 1, wherein said projection comprises a truncated cone;
said insert comprises a second oppositely disposed truncated cone.

4. A corner connector bracket for detachably coupling a plurality of angularly related furniture panel members in a predetermined angular relationship but with adjacent border edge portions of adjacent panels being in spaced apart relation that provides gaps between adjacent edges of adjacent panels comprising:
a plurality of angularly related integrally connected flange members, each having inner and outer surfaces;
each of said flange members including a projection extending outwardly from said outer surface of said flange member;
said projections each including an annular sidewall and a receiving bore therethrough, having an axis inclined to the plane of said respective flange member;
said sidewall having a continuous annular outer surface means, which converges radially inwardly in an axially outward direction, for allowing said projections to be located in and dislocated from complementary recesses provided in said panel members without movement of said panel members, with said panel members disposed in a predetermined angular relationship relative to one another.

5. The connector bracket set forth in claim 4, wherein said axis of said bore is inclined at an included angle more than substantially 45° to the plane of said respective flange member.

6. The connector bracket set forth in claim 5, wherein said axis is substantially perpendicular to said plane of said respective flange member.

7. The connector bracket set forth in claim 4, wherein at least a portion of said sidewall comprises a portion of a truncated cone.

8. The connector bracket set forth in claim 7, wherein said portion of said truncated cone on each of said flange members is disposed on the side of said axis furthest removed from the other of said flange members.

9. The connector bracket set forth in claim 7, wherein said portion of said outer surface means tapers smoothly radially inwardly in an axially outer direction.

10. The connector bracket set forth in claim 9, wherein said portion of said outer surface means is inclined at an included angle less than substantially 45° relative to the plane of said outer surface of said respective flange member.

11. The connector bracket set forth in claim 4, wherein each of said projections has a truncated, generally conical outer surface which converges radially inwardly in an axially outer direction.

12. The connector bracket set forth in claim 11, wherein said outer surface means of said projection of each flange member is substantially radially symmetrical about the axis of said bore.

13. The connector bracket set forth in claim 12, wherein said outer surface means of each projection is inclined at an included angle less than 45° relative to the plane of said outer surface of said respective flange member.

14. The connector bracket set forth in claim 13, wherein said plurality of flange members are substantially perpendicular to each other.

15. The connector bracket set forth in claim 4, further comprising a panel insert having a bolt receiving bore therethrough and a truncated, generally conical outer surface adapted to be received in a complimentarily shaped conforming recess provided in said panel.

16. The connector bracket set forth in claim 14, wherein said outer surface means converges radially inwardly in an axially inward direction.

17. A connector for use in detachably connecting angularly related furniture panel members, comprising a plurality of angularly related flange members each having inner and outer surfaces, each of said flange members having a continuous annular projection extending outwardly from said outer surface of said flange member, said annular projection adapted to receive a bolt;
each of said projections having outer surface means, which tapers smoothly away from said outer surface of the respective flange member, for allowing said projections to be located simultaneously in complementary recesses provided in said panel members with the panel members disposed in a predetermined angular relationship relative to one another.

18. The connector set forth in claim 17 in which each of said projections has a truncated, generally conical outer surface which narrows away from said outer surface of the respective flange member.

19. The connector set forth in claim 18 in which said outer surface of each flange member is generally planar, and said outer surface means of said projection of each flange member is substantially radially symmetric about an axis of radial symmetry substantially perpendicular to said outer surface of said respective flange member.

20. The connector set forth in claim 19 in which said plurality of flange members comprises first and second flanges whose outer surfaces are substantially perpendicular to one another.

21. The connector set forth in claim 20 in which said plurality of flange members comprises a third flange member whose outer surface is generally perpendicular to each of said outer surfaces of said first and second flange members.

22. The connector set forth in claim 20 in which said outer surface means of each projection is inclined at an included angle less than substantially 45° to the plane of said outer surface of said respective flange member.

23. The connector set forth in claim 20 in which each of said projections includes an internal thread for receiving a bolt in threaded engagement, and in which said outer surface means of each projection is inclined at an angle less than substantially 45° to said outer surface of said respective flange member.

24. In a furniture component, a joint comprising:
first, second and third panels, each panel having a first side face, a second oppositely-disposed side face, and an aperture at a border edge portion of said panel extending from said first side face to said second side face;
first and second connectors for maintaining side panels in a predetermined angular, but spaced-apart, relationship to provide outwardly opening openings between adjacent edges of adjacent panels substantially the length of said panel edge, each of said connectors comprising first and second angularly-related flange members, each of said flange members having an inner surface and an outer surface abutting one of said side faces;
each of said connectors including an annular projection extending outwardly from said outer surface of said flange member, each of said projections having an aperture and an internal thread located within said aperture;
said projection of said first flange member of said first connector seated in one end of said aperture of said first panel;
said projection of said first flange member of said second connector seated in the other end of said aperture of said first panel;
said projection of said second flange member of said first connector seated in said aperture of said second panel;
said projection of said second flange member of said second connector seated in said aperture of said third panel;
a first bolt securing said second panel to said first connector, said first bolt extending through said aperture in said second penel and threaded in said internal thread in said aperture of said projection of said second flange member of said first connector element;
a second bolt securing said third panel to said second connector, said second bolt extending through said aperture in said third panel and threaded in said internal thread in said aperture of said projection of said second flange member of said second connector; and
a third bolt securing said first flange members of said first and second connectors to said first panel, said third bolt having a shaft with an unthreaded shaft portion extending through said aperture in said projection of said first flange member, first connector and a threaded portion received in threaded engagement in said internal thread of said projection of said first flange member of said second connector;
said projections of said connectors having substantially identical tapered outer surfaces which converge continuously away from said outer surface of the respective flange member; and,
each of said panels having a first seat portion located in said first side surface of said panel about said aperture in said panel and a second seat portion located in said second side surface of said panel about said aperture in said panel, said first and second seat portions shaped to receive said outer surface of one of said projections in substantially conforming engagement.

25. The joint set forth in claim 24, comprising an insert having a first insert surface received in conforming engagement in said first seat portion of said second panel and a second insert surface against which a head portion of the first bolt is located.

26. The joint set forth in claim 25 in which said second insert surface is concave and substantially radially symmetric, and in which said head portion of said first bolt has a substantially flat surface portion substantially flush with said first side surface of said second panel and a substantially radially symmetric surface portion seated in conforming engagement within said second insert surface.

27. A corner connector bracket for detachably coupling a plurality of angularly related furniture panel members comprising:
a plurality of angularly related, integrally connected flange members, each having inner and outer surfaces;
each of said flange members including a projection extending outwardly from said outer surface of said flange member;
said projections each including an annular sidewall and a receiving bore therethrough, having an axis inclined to the plane of said respective flange member;
said sidewall having an annular outer surface which converges radially inwardly in an axially outward direction in a manner such that, with said panel members disposed in a predetermined angular relationship relative to one another, said projections can be located in and dislocated from complementary recesses provided in said panels without movement of said panels; and
a panel insert having a bolt receiving bore therethrough and a truncated, generally conical outer surface adapted to be received in a complementally shaped conforming recess provided in said panel.

28. A method of assembling an article of furniture by detachably coupling a plurality of panels each having first and second parallel side faces spanned by a plurality of end faces, an aperture, perpendicular to said inner and outer side faces, extending from said first side face to said second side face, and a counterbore provided in each of said side faces in axial alignment with said bore, said method comprising the steps of:
pre-assembling said panels in right angular relation relative to each other, with the inner edge portion of one of said end faces of each panel being positioned adjacent but spaced from one of the adjacent inner edge portions of an adjacent end face of an adjacent panel a predetermined distance to provide an outwardly opening gap;
moving a connector bracket, having a plurality of right angularly related integral flange members each provided with outwardly projecting annular projections thereon provided with bolt receiving apertures therein, at an angle of substantially 45° relative to the planes of said panels, while fixedly maintaining said panels in the pre-assembled right angularly related position, between a position removed from said panels to a position abutting said inner faces of said panels in which said projections are received by the complemental recesses in said panels; and
coupling said panels to said flanges of said connector bracket.

29. The method set forth in claim 28 wherein said coupling step includes placing an insert in the opposite end of said apertures in said panels and disposing a bolt in said insert and threadedly coupling said bolt to said bracket.

* * * * *